United States Patent Office 3,304,036
Patented Feb. 14, 1967

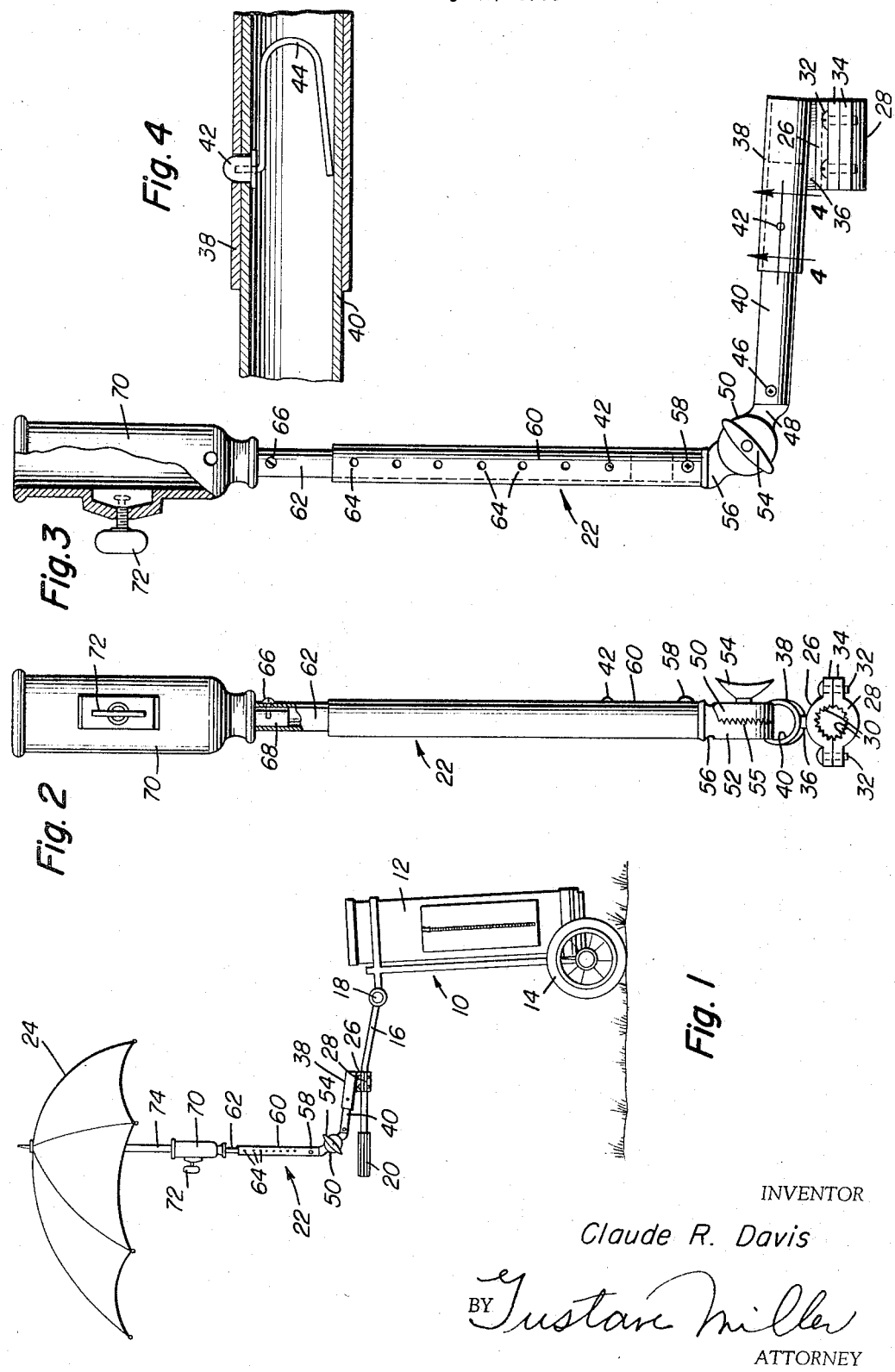

3,304,036
GOLF CART UMBRELLA MOUNTING
ATTACHMENT
Claude R. Davis, 233 Dunlap Court,
Jacksonville, Ill. 62650
Filed July 19, 1965, Ser. No. 473,136
1 Claim. (Cl. 248—41)

This invention relates to a golf cart umbrella attachment and has for an object to provide an attachment for detachably securing an umbrella to the handle of a golf carrying cart, so as to provide both rain protection and sunshade protection to the ardent golfer.

A further object of this invention is to provide an attachment for combining an umbrella with the handle of a golf cart so that the umbrella may be placed in protecting position against either rain or sun, and so that the umbrella may be collapsed and then folded down to an out of the way position, thus facilitating it being carried conveniently when not in use against the possibility of need arising therefor.

A further object of this invention is to provide an eccentric umbrella and umbrella shaft especially intended for use in combination with the attachment structure and with a conventional golf cart, which umbrella may be readily detached, and used independently separate from the combination. In addition, although the eccentric umbrella of this invention may be used, a conventional umbrella may also be used, which conventional umbrella either has a straight handle, or in which the hooked handle, if present, is omitted or removed to provide a straight handle for use in combination with the golf cart umbrella attachment of this invention.

A further object of this invention is to provide an umbrella attachment for a golf cart wherein the umbrella can be adjusted into a number of locations relative to the golf cart and can be closed and folded down relative to the golf cart handle so as to occupy a minimum of space and be out of the way while manipulating the golf cart or the golf clubs. Once attached the attachment need never be removed as it folds down parallel to the golf cart handle completely out the way whether cart is in use or folded up.

A further object of this invention is to provide a simplified form and continuation in part of applicant's pending application Serial No. 421,930 filed December 29, 1964.

In brief, this invention is an attachment for detachably mounting an umbrella on the handle of a golf cart, and consists of two pairs of telescopic members secured together by a two part swivel joint, with a saddle clamp mounted on the projecting end of one member of one pair for mounting it on a golf cart handle, and an umbrella shaft receiving and securing socket mounted on the projecting end of one member of the other pair, the telescopic pair attached to the saddle clamp being detachably secured together, while the members of the umbrella holding telescopic pair are adjustably secured together so that an umbrella may be held at a desired adjusted height.

With the above and related objects in view, this invention consists in the details of construction and combination of parts, as will be more fully understood from the following description, when read in conjunction with the accompanying drawing, in which:

FIG. 1 is a view showing the umbrella holder of this invention as applied to a golf cart.

FIG. 2 is a front elevational view of the umbrella holder.

FIG. 3 is a side elevational view.

FIG. 4 is a sectional view taken on line 4—4 of FIG. 3.

There is shown at 10 a conventional golf cart having its usual golf club bag 12 and wheels 14 arranged to be manipulated in the usual manner by means of the golf cart handle bar 16 which may or may not have an adjusting joint 18, the handle bar 16 being provided with the usual handle bar grip 20. Such carts customarily have but a single handle bar 16, but if there should be two handle bars, the attachment 22 of this invention, and its eccentric umbrella 24 may be attached as hereinafter set forth to either handle bar, if two be present. Although the umbrella 24 is shown as eccentric, to provide greater than usual coverage to the user, the usual concentric umbrella may be used, so long as it has a straight umbrella handle or shaft, or the conventional U-shaped handle may be omitted or removed.

The attachment 22 includes a clamp consisting of a saddle 26 and a saddle clamp 28 for embracing the golf cart handle bar 16. The saddle and saddle clamp are preferably internally serrated, either longitudinally as shown at 30, or at any other convenient angle so that, when secured together by four stud bolts 32 through complementary apertured ears 34, the clamp will be securely attached anywhere along the handle bar 16 but preferably so that the umbrella 24 will be supported over the handle bar grip 20.

Secured, as by welding 36, to the saddle 26 is a telescopic sleeve 38 into which extends a complementary, hollow telescopic rod 40 detachably held therein by a bullet catch 42 urged into latching position by a U-shaped spring 44, as shown in detail in FIG. 4. Secured in the projecting end of rod 40 as by a screw 46 is a boss 48 extending from a swivel joint portion 50. A second swivel joint portion 52, complementary to the first swivel joint portion 50 is secured in adjusted position by a thumb screw 54 threaded through one joint portion into the other, the complementary contacting faces of the joint portions being radially serrated at 55 so that they may be easily maintained in adjusted position by the thumb screw 54.

A boss 56 on the second swivel joint portion 52 is secured by screw 58 in the projecting end of a telescopic sleeve 60 forming part of a second pair of telescopic members, a hollow telescopic rod 62 being adjustably held in position in sleeve 60 by a similar bullet catch 42, which may extend through any selected one of a number of latch holes 64. At the projecting end of the hollow rod 62, a screw 66 secures a boss 68 depending from an umbrella shaft receiving and securing socket 70, a thumb set screw 72 extending through the side of the socket 70 for securing the inserted umbrella shaft 74 of umbrella 24 therein.

In operation, with the cart handle 16 set at the desired adjusted angle by the joint 18, the attachment 22 of this invention is secured in place by embracing the cart handle 16 near the handle grip 20 by the saddle 26 and saddle clamp 28. With the swivel joint 50, 52 set at the desired angle and releasably held by the joint thumb screw 54, the umbrella shaft handle 74 is secured by thumb screw 72 in socket 70, and the height of the umbrella 24 is adjusted as desired by the bullet catch 42 being moved to and held in the desired latch hole 64. The umbrella as thus placed extends just above the handle grip 20 to provide the desired protection against either rain or hot sun to the golfer. Obviously, the angle of the umbrella is adjusted by the thumb screw 54 according to the weather, and when the umbrella is not desired, it may be closed in the conventional manner, and then the swivel joint 50, 52 is adjusted to place the umbrella shaft 74 in a horizontal position, extending forwardly out of the way, over the cart handle 16.

There are three distinct advantages of this device: (1) To use only to hold an umbrella while hitting a shot.

(It has always been a problem to know what to do with the umbrella while the player hits a shot, as he must lay it on the wet ground, and if there is any measurable amount of wind, it will be gone before the player hits his shot.) (2) To hold the umbrella over the player while he pulls the cart plus having it held while hitting a shot. (3) To keep the bag and clubs dry when the player seeks shelter and there is not sufficient room for bag, clubs and player, which happens often.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A golf cart umbrella attachment comprising a saddle clamp means for attachment about a golf cart handle, a telescopic sleeve secured to said clamp means, a telescopic rod detachably secured to said telescopic sleeve, a swivel coupling portion secured to said telescopic rod, a second swivel coupling portion, bolt means adjustably securing said swivel coupling portions in desired adjusted position, a telescopic sleeve secured to said second swivel coupling portion, a telescopic rod adjustably mounted in said second mentioned telescopic sleeve, an umbrella shaft end receiving socket secured on said second mentioned telescopic rod and an umbrella shaft securing thumb set screw threaded through a side of said socket, said telescopic rods being hollow, and bullet catches in said hollow telescopic rods securing said sleeves to said rods, said saddle clamp means being a saddle member secured to said first mentioned sleeve, a saddle clamp member, said members being internally serrated, and complementary apertured ears on said members for securing said clamp members in clamping position on the golf cart handle, said swivel coupling portions being complementarily serrated.

References Cited by the Examiner

UNITED STATES PATENTS

| | | | |
|---|---|---|---|
| 278,973 | 6/1883 | Kizer | 248—40 |
| 582,170 | 5/1897 | Brown | 248—43 |
| 2,200,183 | 5/1940 | Legg | 248—41 |
| 2,559,421 | 7/1951 | Garrett | 248—38 |
| 2,822,143 | 2/1958 | Johansen | 248—41 |

FOREIGN PATENTS

| | | |
|---|---|---|
| 359,459 | 10/1931 | Great Britain. |
| 86,129 | 1/1921 | Switzerland. |

CLAUDE A. LE ROY, *Primary Examiner.*